(12) United States Patent
Muntés-Mulero et al.

(10) Patent No.: US 9,979,608 B2
(45) Date of Patent: May 22, 2018

(54) CONTEXT GRAPH GENERATION

(71) Applicant: CA, Inc., New York, NY (US)

(72) Inventors: Victor Muntés-Mulero, Barcelona (ES); Serguei Mankovskii, Morgan Hill, CA (US); Marc Solé Simó, Barcelona (ES)

(73) Assignee: CA, Inc., New York, NY (US)

( * ) Notice: Subject to any disclaimer, the term of this patent is extended or adjusted under 35 U.S.C. 154(b) by 144 days.

(21) Appl. No.: 15/083,046

(22) Filed: Mar. 28, 2016

(65) Prior Publication Data

US 2017/0279687 A1     Sep. 28, 2017

(51) Int. Cl.
   *H04L 12/24*     (2006.01)
(52) U.S. Cl.
   CPC .......... *H04L 41/145* (2013.01); *H04L 41/065* (2013.01)
(58) Field of Classification Search
   None
   See application file for complete search history.

(56) References Cited

U.S. PATENT DOCUMENTS

| 7,965,620 B2* | 6/2011 | Gadgil | H04L 45/28 |
| | | | 370/216 |
| 2011/0231704 A1* | 9/2011 | Ge | G06F 11/0709 |
| | | | 714/26 |
| 2012/0059683 A1* | 3/2012 | Opalach | G06Q 10/06 |
| | | | 705/7.27 |
| 2014/0219107 A1* | 8/2014 | Racz | H04L 41/0631 |
| | | | 370/242 |
| 2017/0075749 A1* | 3/2017 | Ambichl | G06F 11/079 |

OTHER PUBLICATIONS

Bahl, et al., "Towards Highly Reliable Enterprise Network Services Via Inference of Multi-level Dependencies", SIGCOMM '07 Proceedings of the 2007 conference on Applications, technologies, architectures, and protocols for aomputer communications, Aug. 27, 2007, 12 pages.

(Continued)

*Primary Examiner* — Eunsook Choi
(74) *Attorney, Agent, or Firm* — Gilliam IP PLLC

(57) ABSTRACT

As a network increases in size and complexity, it becomes increasingly difficult to monitor and record relationships between components in the network. The lack of knowledge regarding component relationships can make it difficult to adequately and timely perform analysis of network issues or conditions. As a result, automated generation of a context graph that displays relationships among both hardware and software components in a network can help keep pace with a growing network and improve network analysis. The context graph may be generated based, for example, on event data (alternately referred to as event indications) generated by network components and/or event monitoring agents and network topology information. Additionally, the context graph may be augmented to display inter-component relationships based on multi-event correlations. The context graph can be used to assist in troubleshooting network issues or performing root cause analysis.

18 Claims, 7 Drawing Sheets

(56) References Cited

OTHER PUBLICATIONS

Calyam, et al., "Topology-Aware Correlated Network Anomaly Event Detection and Diagnosis", Springer Journal of Network and Systems Management (JNSM)—Special Issue on Data Mining for Monitoring and Managing Systems and Networks, 2013., Mar. 26, 2013, 17 pages.

Lou, et al., "Correlating Events with Time Series for Incident Diagnosis", KDD '14 Proceedings of the 20th ACM SIGKDD International Conference on Knowledge Discovery and Data Mining, Aug. 24, 2014, 10 pages.

Mahimkar, et al., "Synergy: Detecting and Diagnosing Correlated Network Anomalies", retrieved on Feb. 5, 2016 from http://www.research.att.com/export/sites/att_labs/techdocs/TD-7KEJWS.pdf, 2013, 7 pages.

Marvasti, et al., "An Anomaly Event Correlation Engine: Identifying Root Causes, Bottlenecks, and Black Swans in IT Environments", VMware Technical Journal, Jun. 2013, 63 pages, vol. 2, No. 1.

Oliner, et al., "Using Correlated Surprise to Infer Shared Influence", Dependable Systems and Networks (DSN), 2010 IEEE/IFIP International Conference, Jun. 28, 2010, 10 pages, Chicago, IL.

Pearl, "Causal inference in statistics: An overview", Statistics Surveys, <http://ftp.cs.ucla.edu/pub/stat_ser/r350.pdf>, Sep. 2009, pp. 96-146, vol. 3.

Yan, et al., "G-RCA: A Generic Root Cause Analysis Platform for Service Quality Management in Large IP Networks", IEEE/ACM Transactions on Networking, Mar. 16, 2012, pp. 1734-1747, vol. 20, Issue. 6.

\* cited by examiner

CONTEXT GRAPH GENERATION

BACKGROUND

The disclosure generally relates to the field of computer systems, and more particularly to component mapping and analysis.

Information related to interconnections among components in a system is often used for root cause analysis of system issues. For example, a network administrator or network management software may utilize network topology and network events to aid in troubleshooting issues and outages. Network topology describes connections between physical components of a network and may not describe relationships between software components. Events are generated by a variety of sources or components, including hardware and software. Events may be specified in messages that can indicate numerous activities, such as an application finishing a task or a server failure.

BRIEF DESCRIPTION OF THE DRAWINGS

Aspects of the disclosure may be better understood by referencing the accompanying drawings.

DESCRIPTION

Figure 1:
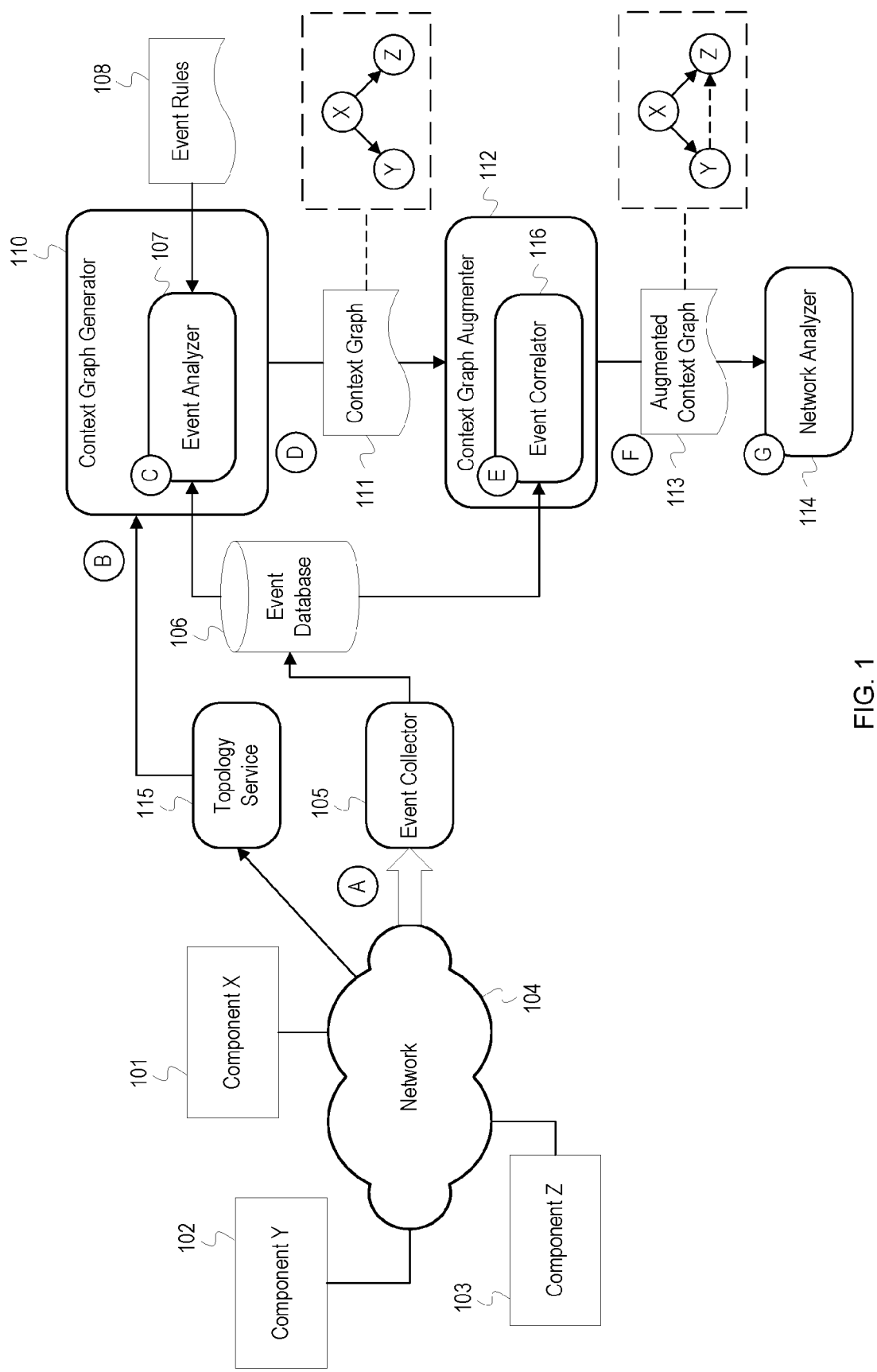
FIG. 1 depicts an example system for generating and augmenting a context graph.

The description that follows includes example systems, methods, techniques, and program flows that embody aspects of the disclosure. However, it is understood that this disclosure may be practiced without these specific details. For instance, this disclosure refers to generating context graphs that represent networks in illustrative examples. But aspects of this disclosure can be applied to generating context graphs that represent relationships between components in a local hardware or software system, such as a storage system or distributed software application. In other instances, well-known instruction instances, protocols, structures and techniques have not been shown in detail in order not to obfuscate the description.

Terminology

The term "component" as used in the description below encompasses both hardware and software resources. The term component may refer to a physical device such as a computer, server, router, etc.; a virtualized device such as a virtual machine or virtualized network function; or software such as an application, a process of an application, database management system, etc. A component may include other components. For example, a server component may include a web service component which includes a web application component.

The description below uses the term "context graph" to refer to a data structure that depicts connections or relationships between components. A context graph consists of nodes (vertices, points) and edges (arcs, lines) that connect them. A node represents a component, and an edge between two nodes represents a relationship between the two corresponding components. Nodes and edges may be labeled or enriched with data. For example, a node may include an identifier for a component, and an edge may be labeled to represent different types of relationships, such as a hierarchical relationship or a cause-and-effect type relationship. In some implementations, a node may be indicated with a single value such as (A) or (B), and an edge may be indicated as an ordered or unordered pair such as (A, B) or (B, A). In implementations where nodes and edges are enriched with data, nodes and edges may be indicated with data structures that allow for the additional information, such as JavaScript Object Notation ("JSON") objects, extensible markup language ("XML") files, etc. Context graphs may also be referred to in related literature as a triage map, relationship diagram/chart, causality graph, etc.

The description below refers to an indication of an event ("event indication") to describe a message or notification of an event. An event is an occurrence in a system or in a component of the system at a point in time. An event often relates to resource consumption and/or state of a system or system component. As examples, an event may be that a file was added to a file system, that a number of users of an application exceeds a threshold number of users, that an amount of available memory falls below a memory amount threshold, or that a component stopped responding or failed. An event indication can reference or include information about the event and is communicated to by an agent or probe to a component/agent/process that processes event indications. Example information about an event includes an event type/code, application identifier, time of the event, severity level, event identifier, event description, etc.

The description below refers to correlating events or event correlation. The process of event correlation involves identifying events that have a connection or relationship to one another, such as a temporal connection, cause-and-effect relationship, etc. Correlating events or event correlation as used herein refers to the identification of this existing relationship and does not include modifying events to establish a connection or relationship.

Overview

As a network increases in size and complexity, it becomes increasingly difficult to monitor and record relationships between components in the network. The lack of knowledge regarding component relationships can make it difficult to adequately and timely perform analysis of network issues or conditions. As a result, automated generation of a context graph that displays relationships among both hardware and software components in a network can help keep pace with a growing network and improve network analysis. The context graph may be generated based, for example, on event data (alternately referred to as event indications) generated by network components and/or event monitoring agents and network topology information. Additionally, the context graph may be augmented to display inter-component relationships based on multi-event correlations. The context graph can be used to assist in troubleshooting network issues or performing root cause analysis.

Example Illustrations

FIG. 1 is annotated with a series of letters A-G. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 1 depicts an example system for generating and augmenting a context graph. FIG. 1 depicts a component X 101, a component Y 102, a component Z 103, an event collector 105, and a topology service 115 that are connected to a network 104. FIG. 1 also depicts a context graph generator 110 ("generator 110"), a context graph augmenter 112 ("augmenter 112"), and a network analyzer 114 ("analyzer 114"). The generator 110 includes an event analyzer 108. The augmenter 112 includes an event correlator 116. The event collector 105, the event analyzer 107 and the event correlator 116 are communicatively coupled to an event database 106.

At stage A, the component X 101, the component Y 102, and the component Z 103 ("the components") either directly or via monitoring agents generate event messages that are received by the event collector 105. The components may be a variety of hardware resources, such as hosts, servers, routers, switches, databases, etc., or software resources, such as web servers, virtual machines, applications, programs, processes, database management systems, etc. The components are connected to the network 104 which may be a local area network, a wide area network, or a combination of both. For example, the component X 101 may belong to a first local network that is connected through the Internet to a second local network with the component Y 102 and the component Z 103. The components may belong to the same or different structural or operational domains within the network 104.

The components are instrumented with agents or probes (not depicted) that monitor the components and generate event indications that specify or otherwise describes events that occur at or in association with one of the components. For example, an event indication may indicate an action performed by a component such as invoking another component, storing data, restarting, etc. Event indications may also be used to report performance metrics such as available memory, processor load, storage space, network traffic, etc. The agents generate and send the event indications to the event collector 105. The event collector 105 may be a part of an event management system that includes multiple event collectors and other event processing code. After receiving the event indications, the event collector 105 stores the event indications in the event database 106 which includes a log of events that have occurred and been detected in the network 104.

At stage B, the generator 110 retrieves and analyzes network topology information from the topology service 115. The generator 110 is a software component that may execute on a server or host and may be part of a network manager or analysis application. The generator 110 produces a context graph 111 data structure that may be rendered to display functional and event-based relationships between the components. As part of generating the context graph 111, the generator 110 retrieves the network topology information that describes the arrangement of components in the network 104. Typically, network topology information indicates the arrangement of physical networking components such as servers, routers, switches, or storage devices; however, in some instances, the topology information may also indicate the arrangement of logical or virtualized network components such as virtual routers or switches. In either instance, the network topology information itself may not map or indicate relationships among software resources such as applications or processes in a network.

The topology service 115 may generate the network topology information using data input by a network administrator, by analyzing OSI Layer 3 or NetFlow data, using network discovery or mapping tools, or any combination of the above. The topology service 115 may monitor the network 104 and maintain the network topology information as new components are added or removed from the network. The generator 110 may communicate with the topology service 115 and request the network topology information using various communication protocols, such as Hypertext Transfer Protocol ("HTTP") REST protocols, or an application programming interface ("API"). The generator 110 may subscribe to the topology service 115 to receive notifications as changes are made to the network topology information. For example, the topology service 115 may maintain a list of subscribers' Internet Protocol ("IP") addresses and push network topology updates to the subscribers.

The generator 110 analyzes the network topology information to identify structural and operational mappings or relationships between the components in the network 104. The network topology information may identify physical connections of components in the network 104, identify logical connections based on the flow of data, or both. For example, the network topology information may indicate that the component X 101 and the component Y 102 are physically connected in the network 104. The network topology information may also indicate that the component X 101, while not directly connected to, may send data to the component Z 103.

At stage C, the event analyzer 107 analyzes event indications in the event database 106. As described above, the event database 106 includes a log of events that have occurred within or in operational association with the components connected via the network 104. By analyzing the event indications, the event analyzer 107 can determine event-based component relationships not indicated in the network topology information. For example, the event analyzer 107 may determine there is a relationship between the component X 101 and the component Y 102 based on analyzing an event which indicates that the component X 101 invoked or called the component Y 102. This relationship may not be indicated in the network topology information for a variety of reasons, such as the components 101 and 102 not being represented in the network topology information or not being physically or logically connected.

The event analyzer 107 analyzes the events in accordance with event rules 108. The event rules 108 are configurable rules or policies that affect how the event analyzer 107 processes event indications. The event rules 108 may specify information such as an event rule type, rule scope, hierarchy information, event parsing information, and an action to be performed. For example, an event rule in the event rules 108 can be of a type "hierarchy," apply to all events, include hierarchy information that indicates a component's location in a logical or physical hierarchy, and indicate that nodes and edges should be generated for a component and each corresponding component in a hierarchy. Event rules are described in more detail in FIG. 2.

At stage D, the generator 110 generates and sends the context graph 111 to the augmenter 112. The generator 110 generates the context graph 111 by combining the component relationship information from (1) the network topology information provided by the topology service 115 and (2) the event analysis of the event analyzer 107. For example, based on analyzing the network topology information, the generator 110 may determine that there is a relationship between the component X 101 and the component Y 102. Based on the event analysis, the event analyzer 107 may determine that there is a relationship between the component X 101 and the component Z 103. The generator 110 combines these relationships and generates the context graph 111 based on the combined relationships.

As depicted in FIG. 1, the context graph 111 indicates that the component X 101 is related to the component Y 102 and the component Z 103. The context graph 111 is a data structure that specifies and may be rendered to display or otherwise processed to otherwise indicate a plurality of nodes (vertices) and edges. The nodes of the context graph 111 represent the components in the network 104 while the edges of the graph represent structural and/or operational relationships between the components. The edges may be undirected, unidirectional, or bidirectional and may indicate dependencies between components. As shown in FIG. 1, context graph 111 specifies two unidirectional edges that visually or computationally indicate that the component X 101 depends on the component Y 102 and the component Z 103. In some implementations, the directionality of the edges may not indicate inter-component dependencies but may instead indicate a flow of data or may indicate component-based event dependencies such as a failure chain in which a failure in the component X 101 causes a failure in the component Y 102 and the component Z 103. Additionally, nodes may be connected by one or more edges to one or more different nodes. The context graph 111 may be represented by a variety of data structures such as adjacency lists, adjacency matrices, incidence matrices, etc. The nodes and edges may be data rich and include information such as component identifiers or other component information, performance data with timestamps, etc. For example, a node may include a component identifier and may indicate that the component is a server, and an edge may indicate that components connected by the edge invoked each other 100 times within a session during a given time period.

After generating the context graph 111, the generator 110 sends the context graph 111 to the augmenter 112. In some implementations, the augmenter 112 may execute on a separate system, so the generator 110 may transmit the context graph 111 using various communication protocols. In some implementations, the generator 110 and the augmenter 112 may execute on the same system. In such implementations, the generator 110 may not transmit the context graph 111 but may instead store the context graph 111 in memory or storage at a preconfigured location or at a location that the generator 110 then provides to the augmenter 112.

At stage E, the event correlator 116 analyzes event indications from the event database 106 to identify or otherwise determine additional component relationships through event correlation. As described above, the event analyzer 107 analyzes events to identify direct component relationships, such as the component X 101 invokes the component Y 102. The event correlator 116, however, identifies component relationships based on correlating two or more events. Correlations may arise from a cause-and-effect type relationship. For example, in FIG. 1, the event correlator 116 may identify a relationship between the component Y 102 and the component Z 103 based on an event at the component Y 102, such as a high processor load event, which caused an event at the component Z 103, such as a low memory event. Additionally, correlations may arise from an unknown cause or a common cause between events that is not readily identifiable or for which information is not available or accessible. As discussed in more detail in FIGS. 4-6, the event correlator 116 may utilize various statistical correlation techniques to identify component relationships based on event correlation and to determine probability of relationships between events. These relationships may not be indicated by the network topology information or event analysis by the event analyzer 107. For example, the network topology information may not indicate a relationship if there is no network topology connection between the component Y 102 and the component Z 103, and event analysis by the event analyzer 107 may not reveal the relationship if the component Y 102 does not invoke or otherwise directly interact with the component Z 103. Additionally, even if the other methods indicate a relationship between two components, a relationship revealed by event correlation may be different from such a relationship. For example, an event-correlated relationship between two components can suggest other details such as an indirect correlation which may indicate that the components share system resources or a direct correlation which may indicate that the components are frequently invoked simultaneously.

At stage F, the augmenter 112 augments the context graph 111 with additional edges or nodes to create an augmented context graph 113. The augmenter 112 adds nodes and edges that correspond to the additional component relationships indicated by the correlated events. In FIG. 1, the augmenter 112 adds an edge between the component Y 102 and the component Z 103 based on determining that an event at component Y 102 caused an event at component Z 103 at stage E. The augmenter 112 adds the edge by modifying the data structure that represents the context graph 111. After creating the augmented context graph 113, the augmenter 112 provides the augmented context graph 113 to the analyzer 114.

At stage G, the analyzer 114 analyzes the augmented context graph 113. The analyzer 114 may use the augmented context graph 113 to perform root cause analysis or may use the augmented context graph 113 to assess network conditions. For example, after detection of an anomalous event at the component X 101, the analyzer 114 may use the augmented context graph 113 to determine that the anomalous event may have been caused by an event or condition at either the component Y 102 or the component Z 103. Additionally, the analyzer 114 may, for example, use the augmented context graph 113 to identify network bottlenecks or single points of failure in the network 104. The analyzer 114 may determine a single point of failure by determining that all edge paths lead to a single node or group of nodes. Furthermore, the analyzer 114 may identify critical components by identifying nodes with the most edges and therefore the most relationships to other components.

FIG. 1 is a simplistic example to allow for ease of illustration. In reality, the network 104, and thus the context graphs 111 and 113, will likely comprise hundreds or thousands of interconnected components. The increase in network complexity leads to an increase in complexity of generating and maintaining the context graphs 111 and 113.

Although depicted as static in FIG. 1, the context graphs 111 and 113 are dynamic data structures that change with operation, addition, or subtraction of components in the network 104. For example, as components are added to the network 104, the generator 110 and the augmenter 112 re-analyze topology and events to add the additional components and any additional relationships to the context graphs 111 and 113. The context graphs 111 and 113 may also be updated at periodic intervals as more events are generated among the components connected via network 104. For example, the event correlator 116 may periodically retrieve events from the event database 106. Alternatively, the event database 106 may be configured to push a batch of events to the event analyzer 107 and the event correlator 116 once a number of new events have been received from the network 104. Receiving the batch of events by the event analyzer 107 and the event correlator 116 may trigger re-analysis and updating of the context graphs 111 and 113. Additionally, components and edges may be removed from the context graphs 111 and 113 after analyzing additional events. For example, if no event indications are received for the component X 101 for a period of time, the event analyzer 107 may determine that the component X 101 is no longer present in the network 104 and may remove the corresponding node from the context graph 111. Additionally, some components may be applications or processes that execute periodically. The event analyzer 107 or the event correlator 116 may add nodes or edges for these components while they are executing and remove them after it has been detected that the components are no longer executing. Furthermore, the event analyzer 107 or the event correlator 116 may update/relocate edges as component relationships change. For example, if the component X 101 is a virtual machine, the component X 101 may execute on different hypervisors or servers throughout the network 104.

FIG. 1 depicts generating and augmenting the context graphs 111 and 113 for the components in the network 104. However, the example system for generating and augmenting the context graphs 111 and 113 may be applied to components not connected to a network. For example, a context graph may be generated and augmented for a system at the application level to depict relationships between software components in the system (processes, subroutines, etc.). In some implementations, a separate context graph may be maintained for different layers of a system, such as an infrastructure layer, network layer, application layer, etc. The event analyzer 107 or the event correlator 116 may query the event database 106 to retrieve events related to each layer and analyze/correlate events for each layer individually.

Figure 2:
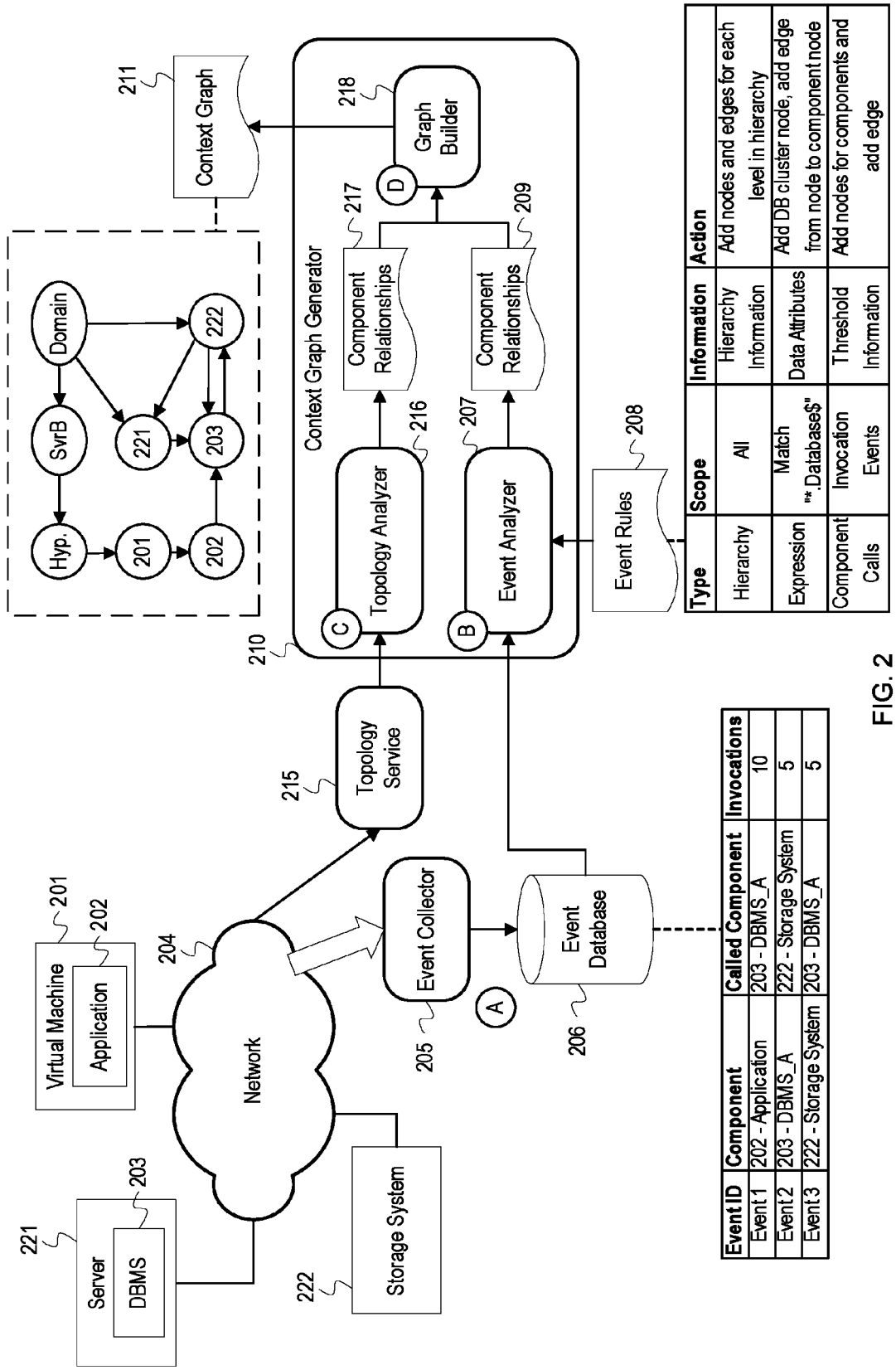
FIG. 2 depicts an example context graph generation system that generates a context graph based on event analysis and network topology.

FIG. 2 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 2 depicts an example context graph generation system that generates a context graph based on event analysis and network topology. FIG. 2 depicts a virtual machine 201, a server 221, a storage system 222, an event collector 205, and a topology service 215 that are connected to a network 204. The virtual machine 201 includes an application 202, and the server 221 includes a database management system ("DBMS") 203. FIG. 2 also depicts a context graph generator 210 ("generator 210") that includes an event analyzer 207, a topology analyzer 216, and a graph builder 218. The event collector 205 and the event analyzer 207 are communicatively coupled to an event database 206.

At stage A, the event collector 205 receives event indications from components in the network 205 and stores them in the event database 206. The event collector 205 receives and stores event indications in a manner similar to event data storage described at stage A of FIG. 1. In FIG. 2, the event collector 205 receives three event indications (Event 1, Event 2, and Event 3) and stores them in respective event indication records within the event database 206. Event 1 specifies that the application 202 invoked or called the DBMS 203 ten times. Event 2 specifies that the DBMS 203 called the storage system 222 five times, and Event 3 specifies that the storage system 222 called the DBMS 203 five times. The event indications may include additional event data that is not depicted. For example, Event 1 may include session information, timestamps for the beginning and end of the session, average response time for the DBMS 203, etc. Event 1, Event 2, and Event 3 are examples of a particular type of event that may be received by the event collector 205. The event collector 205 also receives and stores indications for events of other types in the event database 206 that are not depicted. For example, an event indication in the event database 206 may specify that the storage system 222 has a low amount of disk space available.

At stage B, the event analyzer 207 retrieves and analyzes event indications from the event database 206 in accordance with event rules 208 to identify component relationships 209. The event analyzer 207 may query the event database 206 or utilize an API to retrieve event indications. After retrieving event indications from the event database 206, the event analyzer 207 may begin analyzing all event indications or may filter the event log to identify specific events recorded in the indications. For example, the event analyzer 207 may filter the event indications to identify events that correspond to a particular event type or component in the network 204.

The event analyzer 207 may select a first event indication and determine whether any of the event rules 208 apply to the event data specified by the indication. The event rules 208 include an event rule of type "Hierarchy" which has a scope of "All," i.e. the rule applies to all events. After determining that there is an applicable rule, the event analyzer 207 reads the information from the applicable rule which can indicate how to analyze, parse, or interpret an event. The "Hierarchy" rule includes hierarchy information which indicates hierarchical structure for components in a network. For example, the hierarchy information can indicate identifiers for a domain, host, process, and agent that correspond to a given component. So, for a component such as the application 202, the hierarchical information may indicate identifiers for a domain corresponding to the network 204, a host such as a hypervisor, a process such as the virtual machine 201, and an agent monitoring and generating events for the application 202. Additionally, the hierarchical information may indicate a type of hierarchical relationship such as a one-to-one, one-to-many, many-to-many, etc. For example, the relationship between a hypervisor and the virtual machine 201 may be one-to-many since the one hypervisor may manage many virtual machines. The hierarchy information may be indicated using Unified Modelling Language ("UML"), XML, or other type of metadata or markup language. In some instances, the information for the event rule may indicate how to parse a component identifier to extract identifiers for other hierarchical components. For example, a full identifier for the application 202 may be "DmnA/HstA/VmA/AgntA/AppA," and the hierarchy information may indicate the various hierarchical levels and indicate that the "/" symbol is a delimiter for the identifiers. Additionally, the information may indicate how identifiers are created for each hierarchical level which may reveal additional detail for a component's hierarchical relationship. For example, a compound identifier such as Server1.Application1 may indicate that the application executes on a single server, whereas a non-compound identifier such as Application1 may indicate that the application executes across multiple servers. After analyzing the event indications based on the information, the event analyzer 207 performs actions indicated by the event rule. For the "Hierarchy" rule, the actions include adding nodes and edges for each hierarchy level. For the application 202, the event analyzer 207 may indicate nodes for each of the domain, host, virtual machine 201, agent, and application 202 with edges in between in the component relationships 209.

The event rules 208 also include an event rule of type "Expression." The scope for this event rule indicates that it applies to event indications with component identifiers that match an expression of "*.Database$". The event analyzer 207 compares component identifiers in event indications to the expression and applies this rule to those indications that satisfy the expression. As a result, this event rule will be applied to event indications for components whose identifier includes the database component identifier of "Database$," meaning that these components are all related to the database component. This relation may indicate a database cluster that includes multiple instances of the same database on different components. The "expression" rule actions instruct the event analyzer 207 to add a database cluster node and an edge from the cluster node to the component specified by an event indication. A database cluster is not an actual component but rather a collection of components, but by adding a database cluster node, a context graph can reflect the database cluster and show a relationship among databases or other components in the cluster. The "expression" rule information specifies data attributes in the event indication that should be associated with particular nodes or edges. For example, an event indication for a database component may indicate available storage space. Additionally, the data attribute information may include parsing information that specifies how to parse attribute information from event indications. The data attribute information may instruct the event analyzer 207 to add the available storage space to the node for the database component. As an additional example, an event indication may include an average response time for a database. Instead of adding this information to the database, the data attribute information may instruct the event analyzer 207 to add this information to the database cluster node that was created, as the response time for a database may be indicative of a response time for the database cluster.

The event rules 208 also include an event rule of type "Component Calls" that applies to invocation events such as Event 1, Event 2, and Event 3. When analyzing Event 1, Event 2, and Event 3, the event analyzer 207 determines that the events indicate invocations between components and apply the "Component Calls" rule to the events. The event analyzer 207 performs the actions indicated by the rule and adds nodes and connecting edges for each of the components indicated in the invocation events. However, the "Component Calls" rule also includes threshold information. The threshold information can include criteria that determines whether a relationship between components is indicated in the component relationships 209. For example, for the "Component Calls" rule, the threshold information may specify that a relationship (i.e., an edge between components) should not be added to the component relationships 209 if the number of invocations is less than five. This threshold may be referred to as a relationship indication threshold, as the relationship is not indicated unless the threshold is satisfied. The event analyzer 207 evaluates the threshold criteria prior to adding nodes and an edge to the component relationships 209.

At stage C, the topology analyzer 216 retrieves and analyzes network topology information from the topology service 215. The network topology information is generated and analyzed in a manner similar to that described at stage B of FIG. 1. The topology analyzer 216 generates component relationships 217 based on the network topology information. For example, the topology analyzer 216 may add a component relationship to the component relationships 217 if the network topology information indicates that two components are physically or logically connected. Additionally, the topology analyzer 216 may analyze the topology information in accordance with a set of rules (not depicted) similar to the event rules 208. For example, network topology rules may apply to specific network components and may include thresholds such as an amount of network traffic or number of connected devices that a component should satisfy to be added the component relationships 217. The topology analyzer 216, however, may not add relationships to the component relationships 217 for all connections indicated in the network topology information. For example, the network topology may indicate an amount of network traffic that flows between components based on NetFlow data. The topology analyzer 216 may only add relationships that exceed a threshold amount of network traffic. When adding nodes and edges to the component relationships 217, the topology analyzer 216 may include information such as an amount of network traffic that flows between components, number of hops between components, etc.

At stage D, the graph builder 218 generates the context graph 211 based on the component relationships 209 and the component relationships 217. The graph builder 218 merges the component relationships 209 generated based on event analysis with the component relationships 217. The graph builder 218 then adds the merged relationships to a data structure that represents the context graph 211. In some implementations, the graph builder 218 may deduplicate the component relationships 209 and 217 so that a relationship indicated in both data sets is not added twice. However, the graph builder 218 may first determine that one relationship does not include more information than a duplicate relationship. For example, a relationship in the component relationships 209 may include nodes and edges with attribute information while a relationship in the component relationships 217 may include nodes and edges with network traffic data. The graph builder 218 may merge the node and edge information, maintain information from one relationship, or indicate both relationships in the context graph 211.

The context graph 211 specifies nodes for each of the components connected to the network 204: the virtual machine 201, the application 202, the DBMS 203, the server 221, and the storage system 222. The context graph 211 also specifies nodes that were created in accordance with rules in the event rules 208. For example, the nodes labeled "Hyp." and "SvrB" (hypervisor and server B, respectively) may have been added in response to application of the "Hierarchy" type rule which includes hierarchy information. Similarly, the context graph 211 specifies edges that were added in accordance with the event rules 208. For example, the context graph 211 specifies edges that correspond to component invocations indicated in the events Event 1, Event 2, and Event 3. Additionally, some of the nodes and edges in the context graph 211 may be based on analysis of the network topology information. For example, the edge between the server 221 and the storage system 222 may have been added based on the network topology information indicating a physical connection between these two components.

Figure 3:
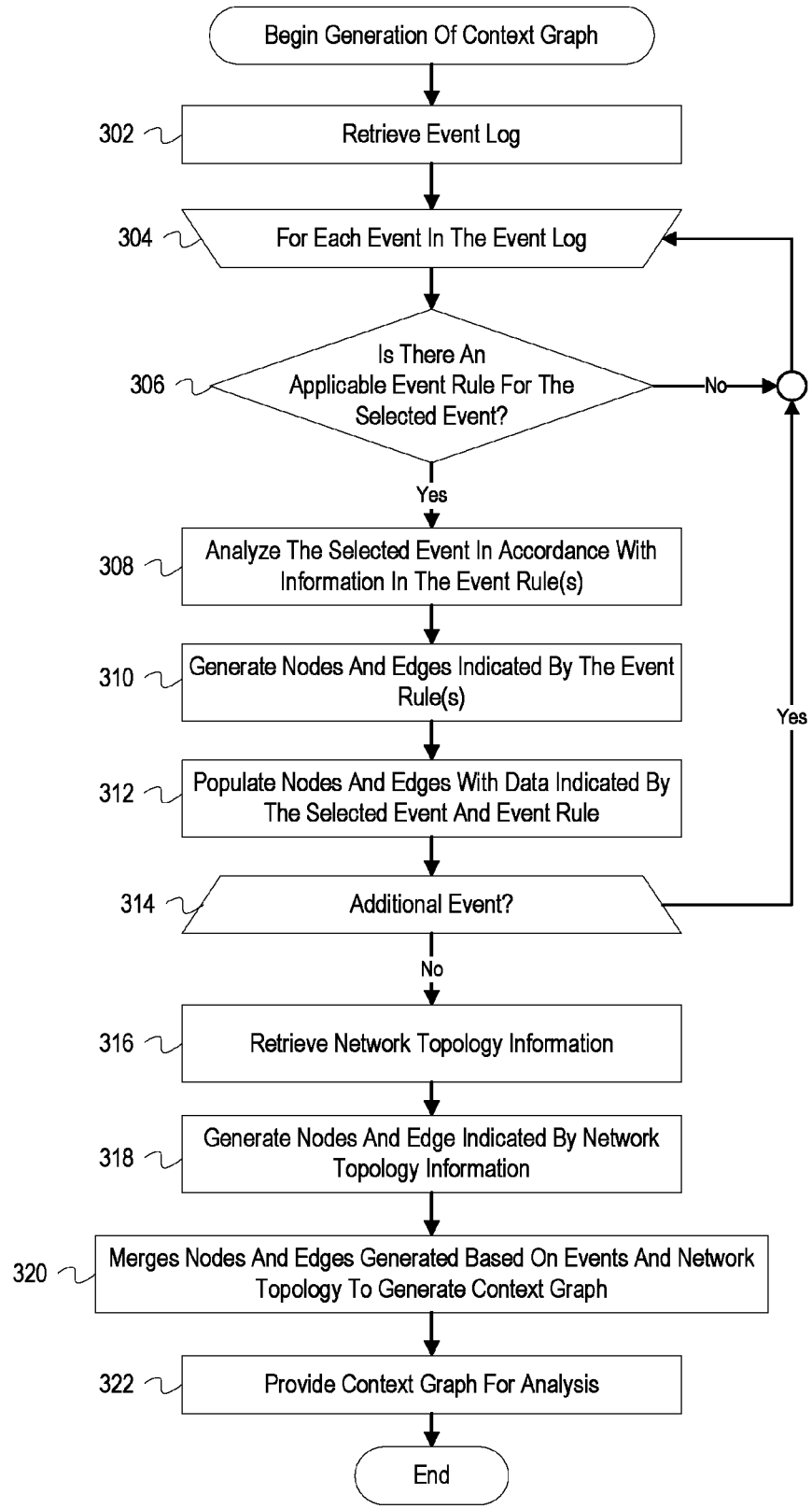
FIG. 3 depicts a flow chart with example operations for generating a context graph.

FIG. 3 depicts a flow chart with example operations for generating a context graph. FIG. 3 refers to a context graph generator performing the operations for naming consistency with FIGS. 1 and 2 even though identification of program code can vary by developer, language, platform, etc.

A context graph generator ("generator") retrieves an event log (302). The generator may retrieve the event log by querying an event database, submitting an API request to an event management system, or reading events from an event communication bus of a network. In some implementations, the generator may periodically receive batches of events from an event management system. The generator may retrieve a number of recent events, events from a particular time period, or events of a particular type. For example, if generating a context graph to aid in analysis of database systems, the generator may retrieve events that pertain to databases, database management systems, etc.

The generator begins operations for each event indication in the event log (304). The generator may iterate through event indications in the event log based on a timestamp associated with the event indication generation or event occurrence, or based on event type. For example, the generator may begin operations with event indications that specify component invocations. The event indication for which the generator is currently performing operations is hereinafter referred to as the "selected event."

The generator determines whether there is an applicable event rule for the selected event (306). The generator may search an event rules catalog using information for the selected event, such as event type or timestamp, to determine whether the selected event triggers or falls within the scope of any of the event rules. Alternatively, the generator may iterate through each of the event rules and determine whether the selected event satisfies the scope criteria for one or more of the event rules. For example, if an event rule has a scope for events with a particular attribute, the generator may determine whether the event rule is applicable to the selected event based on whether the selected event includes the attribute. If the generator determines that there is not an applicable event rule for the selected event, the generator selects the next event from the event log (304).

If the generator determines that there is at least one applicable event rule, the generator analyzes the selected event in accordance with information in the applicable event rule(s) (308). Information in an event rule may include instructions or data required to parse event attributes or component identifiers, hierarchical information for components, component criteria to decide whether to add a component node, relationship criteria to determine whether to indicate a relationship, etc. As part of the event analysis, the generator may, for example, use the information to parse a component identifier to identify other components higher in a hierarchy of the component. The generator may also evaluate attribute data against component criteria. For example, the component criteria may indicate that a node for the component should not be added to a context graph if the component is of a particular type. The generator analyzes the event to determine if the associated component is of the type to be excluded from the context graph. If the event triggered multiple event rules, the generator analyzes the specified event in accordance with each of the event rules.

The generator generates nodes and edges indicated by the event rule(s) (310). The event rules include actions such as generating nodes and edges based on an event specified by event data within a respective indication. The actions may instruct the generator to add nodes for hierarchical components or add abstract nodes that represent a collection or group of components. The actions may instruct the generator to add edges between nodes of components which invoked each other or share a parent component in a hierarchy. The actions may also specify the directionality of the edges to be created. For example, if the selected event indicates that a first component called a second component, the actions may indicate that the directionality of the edge, if any, should be unidirectional from the first component to the second component.

The generator populates node and edge specifiers with data indicated by the selected event and the event rule (312). The actions of the event rules may also instruct the generator to populate the nodes and edges with information from the event rule or data from attributes of the selected event. For example, if an event rule included hierarchy information, the generator may include the hierarchy information or portions of the hierarchy information in each generated node. Additionally, the generator may include attribute data within edges. For example, if an edge was generated based on component invocations, the edge may include attribute data such as the number of times a component invoked another component. In some implementations, data may not be incorporated within the node and edge specifiers themselves. For example, the nodes and edges may be associated with identifiers for the components or event identifiers, and the additional data for the nodes and edges may be associated with the identifiers in a database or other storage device. In such an implementation, an analysis module may use node and edge identifiers to retrieve information from the database.

The generator determines whether there is an additional event in the event log (314). If the generator determines that there is another event, the generator selects the next event from the event log (304).

If the generator determines that there is not another event, the generator retrieves network topology information (316). The generator may retrieve the network topology information from a topology service as indicated in FIGS. 1 and 2 or may retrieve the network topology information from a file generated by a network administrator.

The generator generates node and edge specifiers indicated by the network topology information (318). The generator creates nodes and edges for components and connections indicated in the network topology information. For example, if the network topology information indicates that a first component is connected to a second component, the generator may add nodes for the first and second components, if not already present, and may add an edge between them. Additionally, if the network topology information indicates a logical connection based on traffic flow, the generator may similarly generate nodes and edges for the logically connected components.

The generator merges nodes and edges generated based on event analysis and network topology information to generate a context graph data structure (320). The generator adds the created node and edge specifiers to a data structure that represents the context graph. A node in the context graph may be specified by a single string or character such as the component identifier. An edge may be specified by a pair of identifiers, such as (identifier A, identifier B). The directionality of the edge may be inferred based on the order of the identifiers or may be indicated in a separate data field.

The generator supplies the context graph for analysis (322). For example, the generator may transmit the context graph to a network management application. The network management application may use the context graph to perform root cause analysis or to generally assess network conditions. The collection of nodes and edges in the data structure may be interpreted by the network management application to display the context graph in a graphical manner for interpretation by an administrator. Additionally, the network management application may allow the administrator to view data in nodes and edges or manually adjust and configure the context graph.

The operations described above may be repeated periodically or each time a number of additional events have been received. As the operations are repeated, additional nodes and edges may be generated and added to the context graph. Conversely, existing nodes and edges may be removed from the context graph. For example, an event rule may indicate that an edge should be removed if no event indication corresponding to the relationship indicated by the edge has been received for a period of time. Or, for example, an edge may be removed if an attribute value in an additional event indication, such as a number of invocations, falls below a relationship indication threshold.

Figure 4:
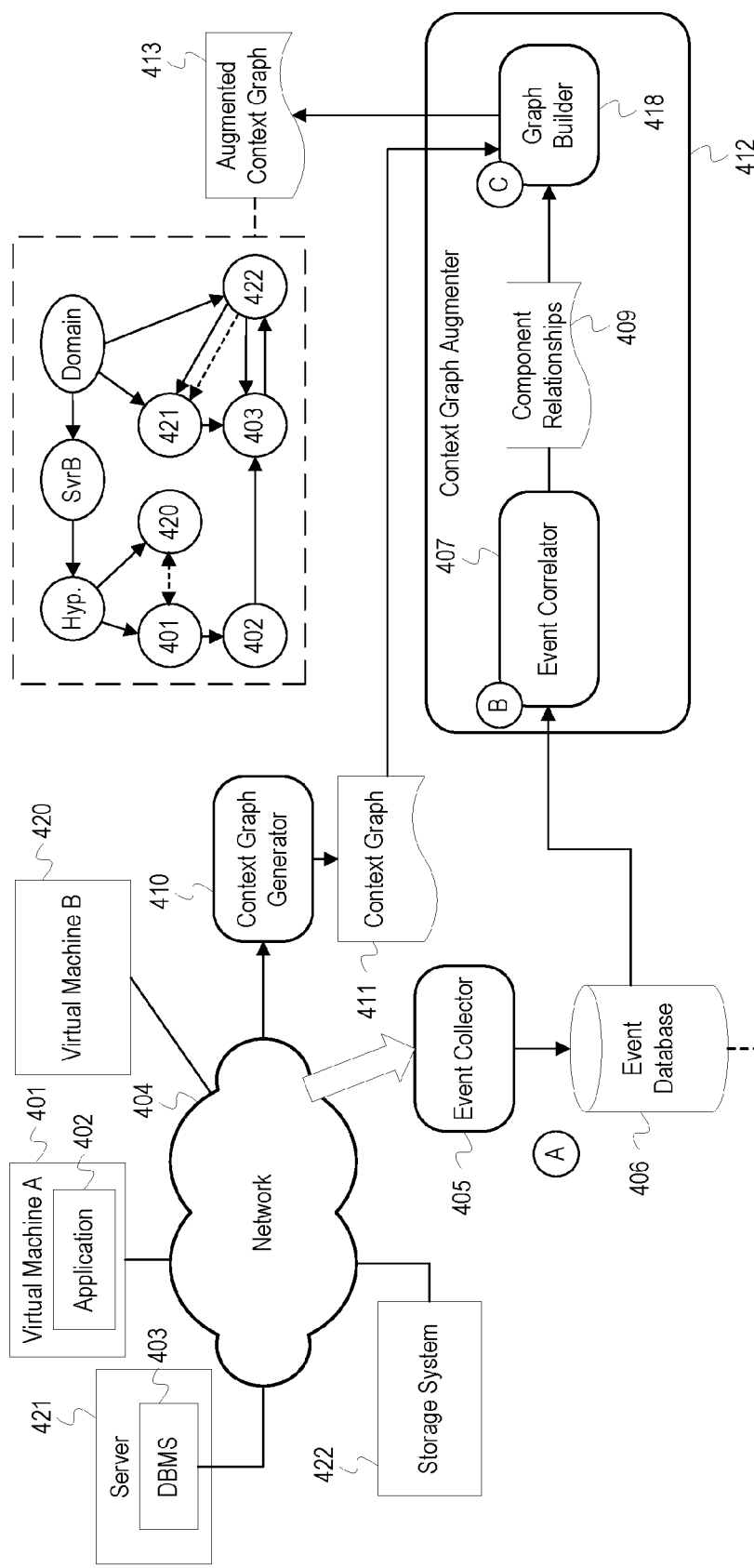
FIG. 4 depicts an example context graph augmenter that augments a context graph based on component-associated event correlation.

FIG. 4 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 4 depicts an example context graph augmenter that augments a context graph based on event correlation. FIG. 4 depicts a virtual machine A 401, a virtual machine B 420, a server 421, a storage system 422, an event collector 405, and a topology service 415 that are connected to a network 404. The virtual machine 401 includes an application 402, and the server 421 includes a DBMS 403. FIG. 4 also depicts a context graph generator 410 ("generator 410") and a context graph augmenter 412 ("augmenter 412"). The augmenter 412 includes an event correlator 407, an anomaly detector 416, and a graph builder 418. The event collector 405, the event correlator 407, and the anomaly detector 416 are communicatively coupled to an event database 406.

At stage A, the event collector 405 receives event indications from components in the network 405 and stores them in the event database 406. The event collector 405 receives and stores event indications in a manner similar to that described at stage A of FIG. 1. In FIG. 4, the event collector 405 receives Events 4-8 in addition to Events 1-3 received by the event collector 205 in FIG. 2 and stored them in the event database 406. Event 4 indicates that the processor load for the virtual machine A 401 was at 95% at time 1:00, and Event 5 indicates that the response time for the virtual machine B 420 was 500 milliseconds at time 1:01. Event 6 indicates that the application 402 invoked the DBMS 403 five times at time 1:15, and Event 7 indicates that the storage system 422 had a response time of 100 milliseconds at time 1:16. Event 8 indicates that the server 421 had a processor load of 85% at time 1:20. The event indications may include additional information that is not depicted. For example, Event 4 may indicate that the processor load is an average for a certain time period and may include a minimum and maximum load for the time period. Events 4-8 are examples of particular types of event indictors that may be received by the event collector 405. The event collector 405 also receives and stores event indications of other types in the event database 406 that are not depicted.

At stage B, the event correlator 407 retrieves and correlates events in the event database 406 to identify component relationships 409. Event correlation refers to the identification of an association between two or more events. In some instances, an event correlation may indicate that a first event caused a second event or that a first series of events caused a second series of events. Additionally, an event correlation may be that two events often occur near simultaneously. The existence of an event correlation may be conditional on event attribute values. For example, the event correlator 407 may determine that a causal connection between a first event and a second event only exists when a particular attribute value of the first event exceeds a threshold. The event correlator 407 may correlate events based on a set of rules or conditions. For example, the event correlator 407 may be configured to determine that two events are associated if the events occurred within a same time window or if the events occurred at components that are within a small number of hops from each other in a network. If any two or more events in the event database 406 match these rules or conditions, the event correlator 407 may correlate the events or indicate that the events are associated. Additionally, correlations may be determined based on a pattern of occurrences. For example, the event correlator 407 may determine that events are correlated if an event log indicates that an event at a first component is often followed by an event at another component or components.

The event correlator 407 may also correlate events based on a statistical, causal, or probability analysis. The event correlator 407 may determine occurrence ratios, correlation coefficients, partial correlations, etc. For example, the event correlator 407 may determine a product-moment correlation coefficient to measure a linear correlational between two event attributes such as processor load. Based on the product-moment correlation coefficient, the event correlator 407 may determine that a first and second event and their attribute values have no correlation, a positive correlation, or an inverse correlation, i.e. the processor load in the first event has no effect on the processor load in the second event; an increase/decrease in load in the first causes an increase/decrease in the second; or an increase in the first causes a decrease in the second, respectively. The event correlator 407 may perform such analysis for each event in the event database 406, for a batch of recent events, for events from a time period, for events related to particular components, etc.

Figure 6:
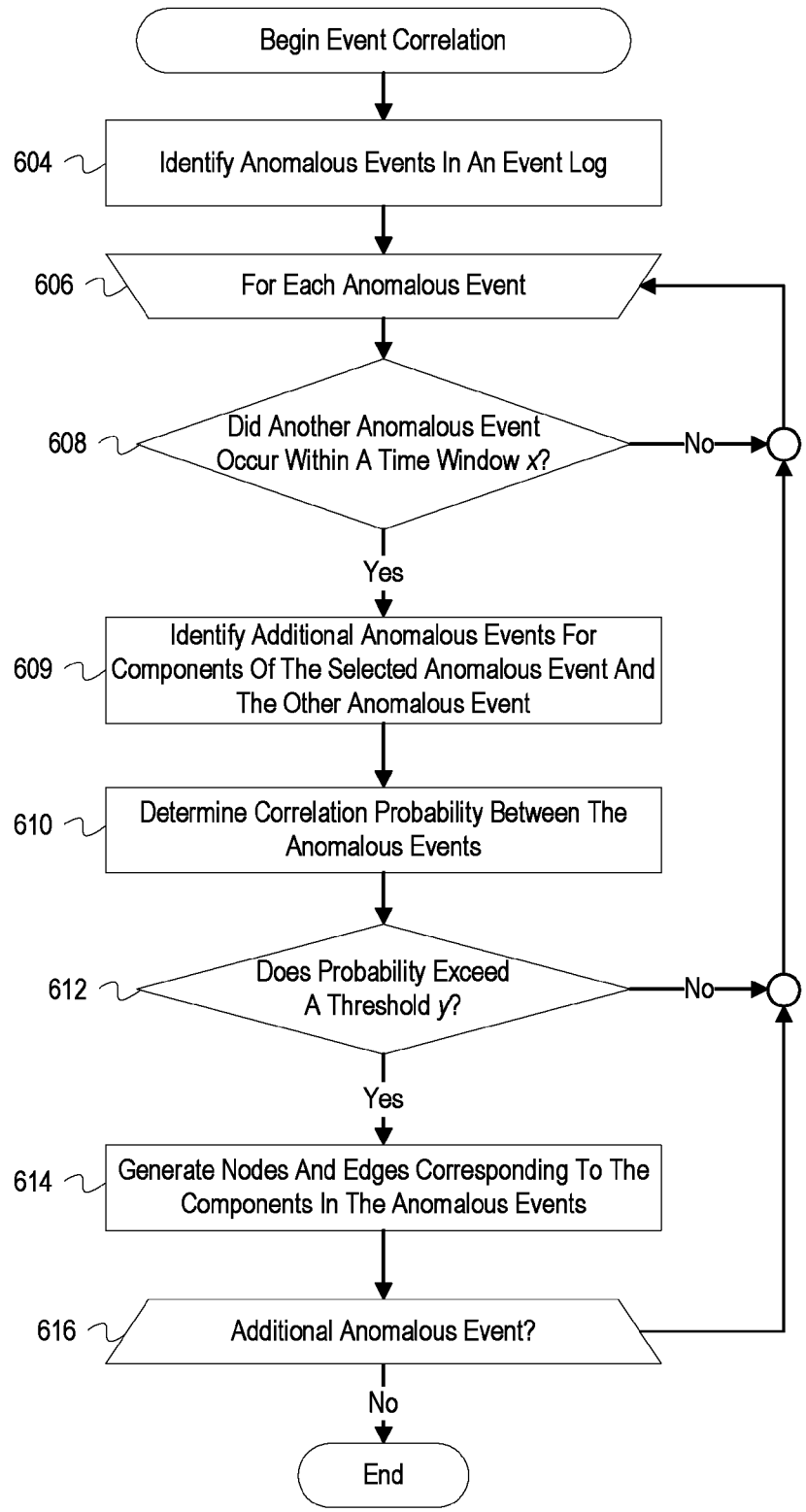
FIG. 6 depicts a flow chart illustrating example operations for identifying and correlating anomalous events in a system.

Additionally, in some implementations such as the one described in FIG. 6, the event correlator 407 may target correlation to anomalous events discovered in the event indications within event database 406. An anomalous event is an event that indicates a network occurrence or condition that deviates from a normal or expected value or outcome. For example, an event may have an attribute value that exceeds or falls below a determined threshold or required value, or an event may indicate that a component shut down or restarted prior to a scheduled time. Additionally, an anomalous event may be an event that indicates a network issue such as a component failure. The event correlator 407 or the augmenter 412 may include program code for an anomaly detector that periodically scans the event database 406 for anomalous events. The anomaly detector may be configured with a set of expected values for particular events or may perform statistical analysis for different event types specified by the event indications. For example, the anomaly detector may retrieve event indications that specify an available memory attribute and determine the standard deviation for the data set. The anomaly detector may then determine all events whose available memory values fall outside the standard deviation to be anomalous. The anomaly detector may then identify the anomalous events to the event correlator 407 so that correlation for the anomalous events may be performed. In some implementations, an event management system that includes the event collector 405 may process events and identify anomalous events or events that trigger an alarm or indicate a network issue and flag the events as anomalous.

A correlation between events indicates a relationship between the corresponding components. Event correlation can reveal component relationships which may not be apparent from baseline event analysis and network topology information. For example, the event correlator 407 may determine that a high number of invocations of a first component by a second component caused a high processor load event to occur at a third component and, thereby, identify a relationship between the first component and third component despite no direct communication between the first and third components. In FIG. 4, the event correlator 407 may correlate Event 4 and Event 5 based on the fact that the events occurred within a one minute time window. The correlation of Event 4 and Event 5 indicates that there is a relationship between the virtual machine A 401 and the virtual machine B 420. Conversely, the event correlator 407 may determine that there is no correlation or may not indicate a correlation between Event 6 and Event 7 despite the fact that the events occurred within the one minute time window. The determination that there is no correlation or the determination to not indicate the correlation may be based on an analysis that the application 402 merely performed five invocations, a small number, which is unlikely to cause a high 300 millisecond response time for the storage system 422. The event correlator 407 may determine that this disparity in attribute values indicates that there is not a correlation or that the disparity indicates that the Event 7 may more strongly correlate to another event. For Event 8, the event correlator 407 may correlate the event to Event 7 based on an identified pattern or condition. For example, the event correlator 407 may have identified a pattern based on past events that an event with a slow response time for the storage system 422 eventually leads to a high processor load event at the server 421.

After correlating events, the event correlator 407 indicates the relationships indicated by the correlated events in the component relationships 409. The event correlator 407 may include data in the relationship specifier (e.g., edge) such as a type of correlation, a determined probability of correlation, a condition that resulted in the correlation, attribute values, etc.

At stage C, the graph builder 418 receives and augments the context graph 411 to create an augmented context graph 413. The context graph 411 was generated by the generator 410 and includes the features of the context graph 211 generated by the generator 210 in FIG. 2. The graph builder 418 augments the context graph 411 with the component relationships 409 by adding and/or modifying edge and node specifiers to represent the additional and/or modified relationships. In FIG. 4, the dashed lines in the augmented context graph 413 indicate the additional relationships that were determined by the event correlator 407. For example, the dashed lines between the virtual machine A 401 and the virtual machine B 420 indicate the relationship determined as a result of the event correlator 407 correlating Event 4 and Event 5. Similarly, the dashed line from the storage system 422 to the server 421 indicates the relationship determined as a result of the event correlator 407 correlating Event 8 and Event 7. The directionality of the relationship can vary based on a determined correlation or correlation type. For example, the event correlator 407 may have determined that Event 4 and Event 5 had a strong linear correlation, and in response, the graph builder 418 generates an edge between the nodes for the virtual machine A 401 and the virtual machine B 420 that is bidirectional. The edge from the storage system 422 to the server 421 based on event correlation was added in addition to an edge that may have been added based on baseline event analysis or network topology information. Both edges may be maintained in the augmented context graph 413 as the edges may include different information or one of the edges may be conditional. For example, the dashed edge based on correlated events may indicate that the relationship is only valid in situations where the storage system 422 previously generated an event with a high response time.

Figure 5:
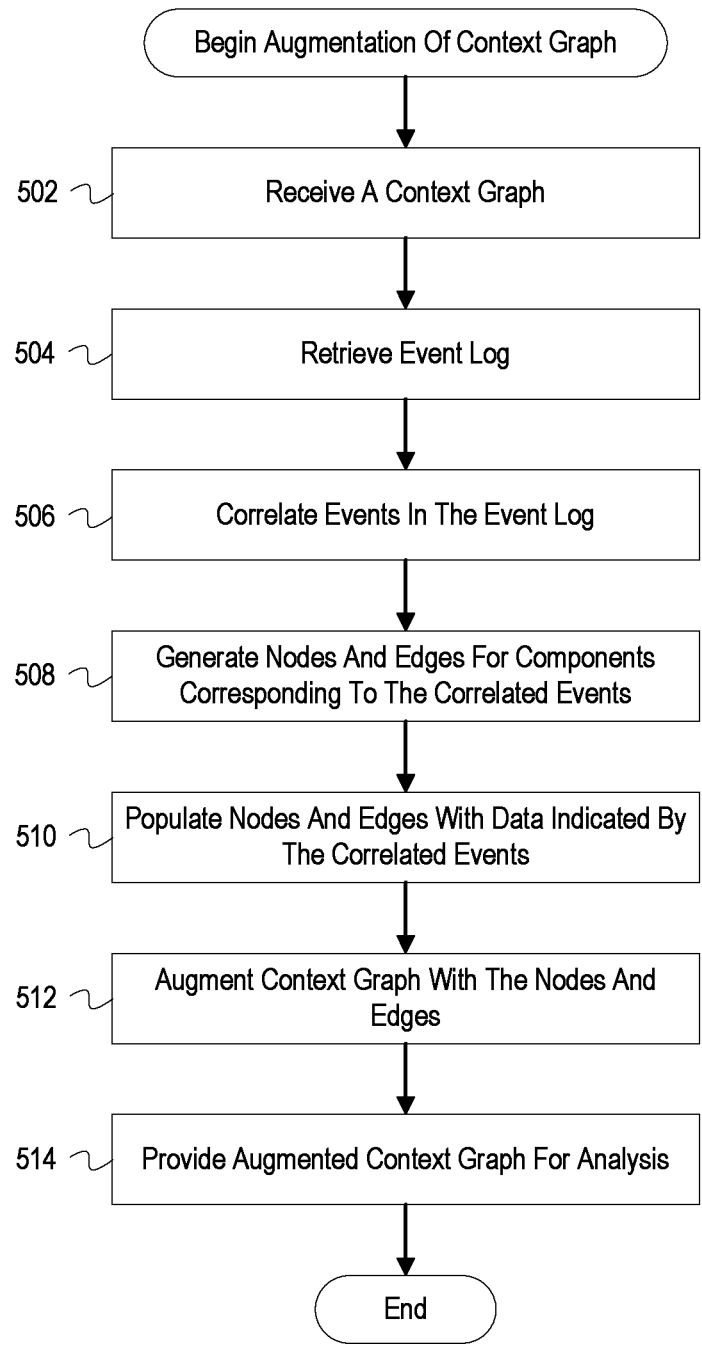
FIG. 5 depicts a flow chart illustrating example operations for augmenting a context graph.

FIG. 5 depicts a flow chart illustrating example operations for augmenting a context graph. FIG. 5 refers to a context graph augmenter performing the operations for naming consistency with FIGS. 1 and 4 even though identification of program code can vary by developer, language, platform, etc.

A context graph augmenter ("augmenter") receives a context graph data structure (502). The augmenter may receive the context graph data structure from a context graph generator or from a network administrator that created and uploaded the context graph through an interface or API for the augmenter.

The augmenter retrieves an event log (504). The augmenter may retrieve the event log by querying an event database, submitting an API request to an event management system, or reading events from an event communication bus of a network. In some implementations, the augmenter may periodically receive batches of events from an event management system. The augmenter may retrieve a number of recent events, events from a particular time period, or events of a particular type. For example, if augmenting a context graph to aid in analysis of network traffic, the generator may retrieve events that pertain to routers, switches, gateways, etc.

The augmenter correlates events in the event log (506) based on a statistical, causal, or probability analysis, based on satisfaction of conditions or rules, based on event pattern analysis, discriminant analysis, or other heuristics. For example, the augmenter may employ machine learning techniques that focus on recognition of patterns and regularities in the events. As the augmenter analyzes events over time, the augmenter may add a rule or condition based on frequently occurring patterns to be used for correlating events. The rule may pertain to patterns between specific component types. For example, the augmenter may determine that when a DBMS has a high processor load event, a storage system has a low memory event. After detecting this pattern, the augmenter generates a rule that indicates that these events between these component types have a correlation. Even though the pattern may have been identified at particular DBMS and storage system components, the augmenter can generically apply the rule to correlate events between other DBMS and storage system components throughout a network. In some implementations, the augmenter may employ genetic algorithms that identify a population of potentially connected events in the event log and use a fitness function to identify those events with a strong connection or correlation. Furthermore, the augmenter may perform correlation using the technique described in FIG. 6. The augmenter may perform correlation for each event specified by the event log indications, for a batch of recent events, for events from a particular time period, for events related to particular components, etc. The augmenter may update the event log to indicate correlations or may maintain correlations in a separate log or table.

The augmenter generates node and edge specifiers for components corresponding to the correlated events (508). The augmenter extracts component identifiers from indications containing the correlated events and generates edges to indicate a relationship between the components. The directionality of the edges may be based on a direction of causality between the components (i.e., an event at a first component caused an event at a second component), a type of correlation, etc. In some instances, the augmenter may generate nodes based on correlated events. For example, the augmenter may determine that a set or series of correlated events indicate a group of related components such as a storage cluster or server processor cluster. The augmenter may generate an abstract node and edges between the abstract node and each of the components to represent the relationship.

The augmenter populates nodes and edges with data indicated by the correlated events (510). The augmenter may add attribute data from the correlated events or may add data generated during the event correlation process such as a probability of correlation or an affinity score that indicates the strength of correlation.

The augmenter augments the context graph with the node and edge specifiers (512). The augmenter adds the generated node and edge specifiers to the context graph received at process block 502. The augmenter adds the nodes and edges by indicating the relationships in the data structure that represents the context graph. In some instances, such as if a relationship is already depicted in the context graph, the augmenter may augment the existing nodes and edges with data from the correlated events or data generated during the event correlation process.

The augmenter provides the augmented context graph for analysis (514). The augmenter may supply the context graph to a network management/analysis application that may use the context graph to perform root cause analysis or to generally assess network conditions. The augmenter may periodically supply an updated augmented context graph to the network management application as the operations described above are repeated for additional events.

Similar to the operations of FIG. 3, the operations described above may be repeated periodically or each time a number of additional events have been received. Additional nodes and edges may be generated and added to the context graph based on identification of additional event correlations. Conversely, existing nodes and edges may be removed from the context graph once an event correlation is no longer identified. For example, if an event correlation was determined based on identification of a pattern, the edges representing the correlation may be removed if the pattern ceases to repeat or changes. Or, for example, an edge may be removed if a probability of correlation falls below a threshold.

FIG. 6 depicts a flow chart with example operations for augmenting a context graph. FIG. 6 refers to an event correlator performing the operations for naming consistency with FIGS. 1 and 4 even though identification of program code can vary by developer, language, platform, etc. The operations depicted in FIG. 6 are examples of operations that may be performed at process block 506 of FIG. 5.

An event correlator ("correlator") identifies anomalous events in an event log (604). An anomalous event is an event that indicates a network occurrence or condition that deviates from a normal or expected value or outcome. The correlator may identify anomalous events using statistical analysis or comparison to configured thresholds or expected values. For example, the correlator may average attribute values of a particular type across a set of events and identify events in the set whose values exceed or fall below the average by a percentage amount to be anomalous. In some instances, the correlator may identify an entire set or series of events to be anomalous. For example, a component may be generating an unusually high number of events of a particular type, and the correlator may identify the number of events of the particular type to be anomalous.

The correlator begins operations for each anomalous event identified in the event log (606). The anomalous event for which the correlator is currently performing operations is hereinafter referred to as the "selected anomalous event."

The correlator determines whether another anomalous event occurred within a time window or period x within which the selected anomalous event occurred (608). The time window x is a configurable value that instructs the correlator how far back in time to search for another anomalous event. For example, if the selected anomalous event occurred at 1:00, the correlator may search the log in a previous five minute time window (i.e., until 12:55) to determine whether another anomalous event occurred. The length of the time window x may be based on a statistical determination that if two events did not occur within a certain temporal proximity then they are unlikely to be related. The time window x may be adjusted based on the results of correlation analysis. For example, the time window x may be shortened if the correlation analysis consistently determines no correlation or low correlation for events that occurred near the constraints of the time window x, or the time window x may be lengthened if few correlations are identified. If the correlator determines that another anomalous event did not occur within a time window x, the correlator selects the next anomalous event (606).

If the correlator determines that another anomalous event did occur within a time window x, the correlator identifies additional anomalous events for components of the selected anomalous event and the other anomalous that occurred within the time window x (609). Performing correlation with multiple anomalous events that occurred over a time period can aid in determining a probability or indicate a stronger correlation than a single occurrence of anomalous events. Accordingly, the correlator may search the anomalous events identified at process block 604 with an identifier for the component associated with the selected anomalous event ("the first component") and an identifier for the component corresponding to the other anomalous event ("the second component"). In addition to the anomalous events identified at process block 604, the correlator may search for other events or anomalous events outside of the time window x. Searching outside the time window x can provide more events for determining a correlation or can accommodate for variations in clocks among the components or variations in recording times for event indications. Based on the results of the search, the correlator may identify a set of anomalous events for the first component and a set of anomalous for the second component. In some implementations, the correlator may filter the sets of anomalous events based on event types or severity of anomaly in order to identify correlation between anomalies of a particular type or severity.

The correlator determines a correlation probability between the anomalous events (610). The probability of a correlation between anomalous events at the first component and anomalous events at the second component may be based an occurrence ratio. In other words, the correlator determines the occurrence ratio to be the number of times that an anomalous event at the second component resulted in an anomalous event at the first component within the time window x divided by a total number of anomalous events at the second component. The occurrence ratio is equal to one if every time an anomalous event occurred at the second component an anomalous event also occurred at the first component within the time window x as the occurrence ratio equation would be 1 to 1. The occurrence ratio is equal to zero if no anomalous events at the second component resulted in an anomalous event at the first component within the time window x. The occurrence ratio is equal to 0.5 if the anomalous event resulted in an anomalous event at the first component half of the time, 0.75 for three quarters of the time, etc.

The correlator determines whether the probability exceeds a threshold y (612). The threshold y is a configured value that is set to a probability value, such as 0.4. The threshold value y may vary based on the types of events being correlated, types of components, etc. For example, if the events being correlated are events that indicate a severe anomaly such as component failure, the threshold y may be adjusted to be lower. If the probability does not exceed the threshold y, the correlator selects the next anomalous event (606), and no relationship between the first component and the second component is indicated.

If the probability that the anomalous event is related to the selected anomalous event does exceed the threshold y, the correlator generates nodes and edges corresponding to the first component and the second component (614). The correlator generates an edge specifier to indicate the relationship between the first component and the second component. The correlator may generate node specifiers for the first component and the second component if they are not already represented in a context graph. The correlator may include data in the node and edge specifiers such as the probability of correlation, the anomalous event types that were correlated, etc.

The correlator determines whether there is an additional anomalous event (616). Before determining whether there is an additional anomalous event, the correlator may remove the anomalous events identified at process block 609 from the anomalous events to be processed or may indicate those events as processed since a correlation between those anomalous events has already been determined. If the correlator determines that there is an additional anomalous event, the correlator selects the next anomalous event (606). If the correlator determines that there is not an additional anomalous event, the process ends.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 310 and 312 of FIG. 3 and blocks 510 and 512 of FIG. 5 can be performed in parallel or concurrently. Additionally, the operations depicted in block 609 of FIG. 6 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as events. In some implementations, events may be iterated over according to an ordering of events, an indication of event importance, an event timestamp, etc. Also, the number of iterations for loop operations may vary. Different techniques for processing and correlating events may require fewer iterations or more iterations. For example, multiple events may be processed or correlated in parallel, event rule. For example, some events may be ignored or disregarded based on an event type or attribute value.

A context graph is described above as being generated for all components in a network. In some implementations, context graph generation may be targeted to a particular system or component or a particular purpose. For example, a context graph may be created for a particular component that has failed. Additionally, a context graph may be created to identify particular issues such as bandwidth bottlenecks.

In the description above, a context graph augmenter augments an existing context graph that was either generated manually or in an automated fashion based on existing data. In some implementations, the context graph augmenter may not have an existing context graph to augment. Instead, the context graph augmenter may not be described as augmenting a context graph but, rather, may be said to generate a context graph based on event correlation.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
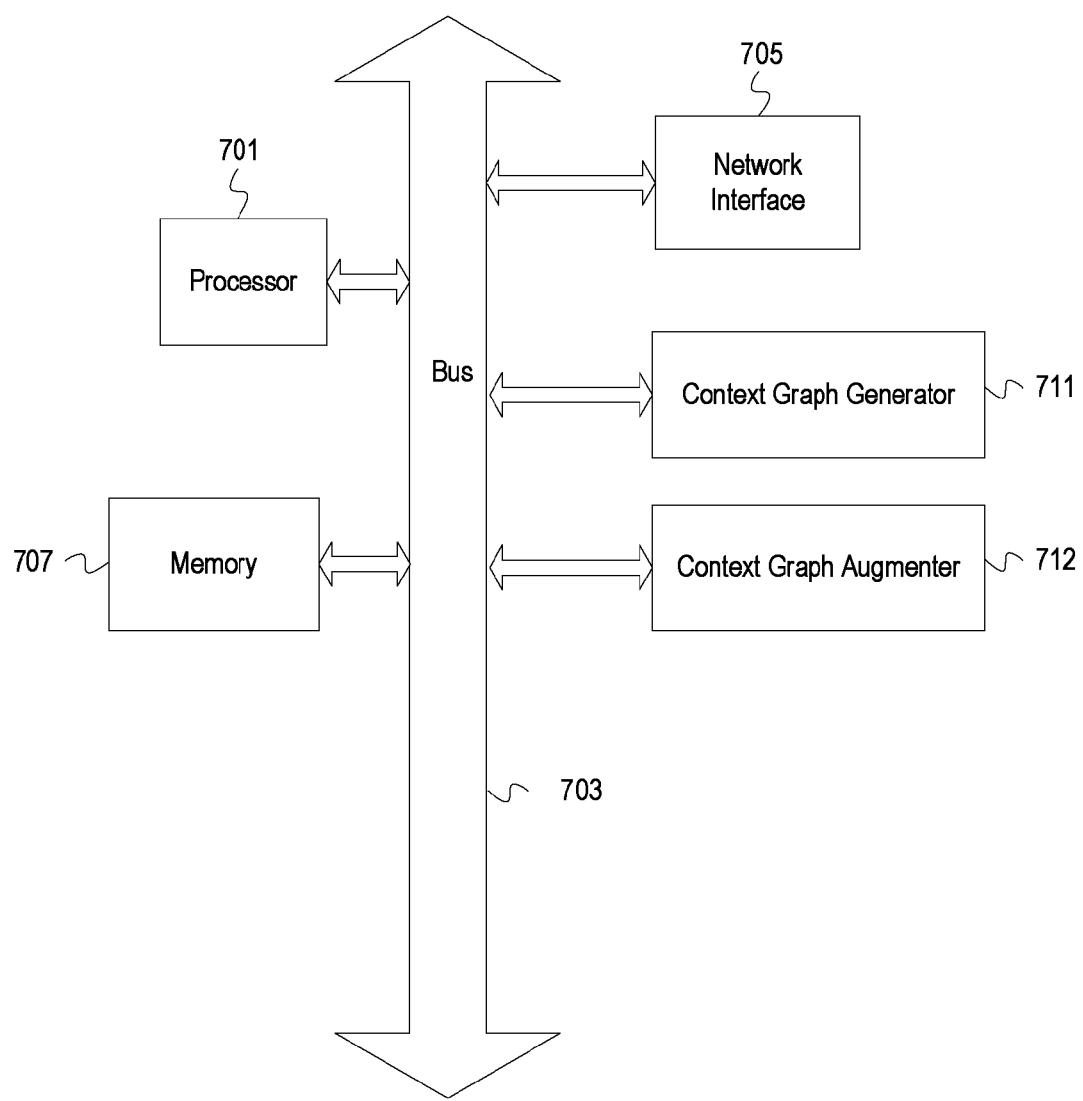
FIG. 7 depicts an example computer system with a context graph generator and context graph augmenter.

FIG. 7 depicts an example computer system with a context graph generator and context graph augmenter. The computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes context graph generator 711 and the context graph augmenter 712. The context graph generator 711 analyzes component events and network topology information to generate a context graph. The context graph augmenter 712 correlates events to identify additional component relationships for augmentation of the context graph. Any one of the previously described functionalities may be partially (or entirely) implemented in hardware and/or on the processor unit 701. For example, the functionality may be implemented with an application specific integrated circuit, in logic implemented in the processor unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701 and the network interface 705 are coupled to the bus 703. Although illustrated as being coupled to the bus 703, the memory 707 may be coupled to the processor unit 701.

While the aspects of the disclosure are described with reference to various implementations and exploitations, it will be understood that these aspects are illustrative and that the scope of the claims is not limited to them. In general, techniques for context graph generation and augmentation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   creating, by a processor, a context graph with a plurality of nodes connected by a plurality of edges based, at least in part, on a topology which indicates physical connections between components in a network, wherein the plurality of nodes corresponds to the components and the plurality of edges corresponds to the physical connections;
   receiving a first event indication generated by an agent monitoring a first component in the network;
   analyzing, by the processor, the first event indication based, at least in part, on a first event analysis rule;
   determining that the first event indication indicates a relationship between the first component and a second component;
   based on a determination that the first component and the second component are not indicated in the context graph, adding a first node for the first component and a second node for the second component to the plurality of nodes in the context graph;
   based on a determination that the first event indication indicates a relationship between the first and the second components and based on a first action indicated in the first event analysis rule,
   identifying, by the processor, a relationship indication threshold in the first event analysis rule which specifies a minimum number of event indications that indicate a relationship to be satisfied before indicating a component relationship; and based on a determination that the first event indication satisfies the relationship indication threshold, adding a first edge to the plurality of edges in the context graph to indicate the relationship between the first component and the second component; and utilizing the context graph to identify relationships among components for root cause analysis of operational anomalies in the network.

2. The method of claim 1 further comprising:

determining that the first event analysis rule includes information related to a hierarchy of components that includes the first component;

based on a second action indicated in the first event analysis rule, indicating a node for each component in the hierarchy of components in the plurality of nodes; and indicating a relationship between each of the nodes corresponding to the hierarchy of components as edges in the plurality of edges.

3. The method of claim 1, wherein creating the context graph based, at least in part, on the topology comprises:

receiving the topology for at least a third component and a fourth component;

determining that the topology information indicates a relationship between the third component and the fourth component; and in response to a determination that the topology information indicates a relationship between the third and the fourth components, indicating the third component as a third node in the plurality of nodes;

indicating the fourth component as a fourth node in the plurality of nodes; and indicating the relationship between the third component and the fourth component as a second edge in the plurality of edges.

4. The method of claim 1, wherein determining that the first event indication indicates a relationship between the first component and the second component comprises determining that the first event indication indicates that the first component invoked the second component.

5. The method of claim 1, wherein adding a first node for the first component and a second node for the second component to the plurality of nodes in the context graph comprises:

in accordance with parsing information in the first event analysis rule, parsing the first event indication to determine a first identifier for the first component and a second identifier for the second component; and indicating the first identifier in the first node and indicating the second identifier in the second node.

6. The method of claim 1, wherein analyzing the first event indication based, at least in part, on the first event analysis rule is in response to determining that the first event indication triggers the first event analysis rule based, at least in part, on a scope of the first event analysis rule.

7. The method of claim 1 further comprising:

indicating attribute data extracted from the first event indication in at least one of the first node, the second node, and the first edge;

wherein analyzing the first event indication based, at least in part, on the first event analysis rule comprises extracting the attribute data from the first event indication based, at least in part, on attributes identified by the first event analysis rule.

8. The method of claim 1, wherein the first component and the second component are software processes within the network.

9. One or more non-transitory machine-readable storage media having program code for generating a context graph stored therein, the program code to:

create, by a processor, a context graph with a plurality of nodes connected by a plurality of edges based, at least in part, on a topology which indicates physical connections between components in a network, wherein the plurality of nodes corresponds to the components and the plurality of edges corresponds to the physical connections;

receive a first event indication generated by an agent monitoring a first component in the network;

analyze, by the processor, the first event indication based, at least in part, on a first event analysis rule;

determine whether the first event indication indicates a relationship between the first component and a second component;

based on a determination that the first component and the second component are not indicated in the context graph, add a first node for the first component and a second node for the second component to the plurality of nodes in the context graph;

based on a determination that the first event indication indicates a relationship between the first and the second components and based on a first action indicated in the first event analysis rule, identify, by the processor, a relationship indication threshold in the first event analysis rule which specifies a minimum number of event indications that indicate a relationship to be satisfied before indicating a component relationship; and based on a determination that the first event indication satisfies the relationship indication threshold, add a first edge to the plurality of edges in the context graph to indicate the relationship between the first component and the second component; and utilize the context graph to identify relationships among components for root cause analysis of operational anomalies in the network.

10. The machine-readable storage media of claim 9, wherein the program code to create the context graph based, at least in part, on the topology comprises program code to:

receive the topology for at least a third component and a fourth component;

determine whether the topology information indicates a relationship between the third component and the fourth component; and in response to a determination that the topology information indicates a relationship between the third and the fourth components, indicate the third component as a third node in the plurality of nodes;

indicate the fourth component as a fourth node in the plurality of nodes; and indicate the relationship between the third component and the fourth component as a second edge in the plurality of edges.

11. An apparatus comprising:

a processor; and a machine-readable medium having program code executable by the processor to cause the apparatus to, create, by the processor, a context graph with a plurality of nodes connected by a plurality of edges based, at least in part, on a topology which indicates physical connections between components in a network, wherein the plurality of nodes corresponds to the components and the plurality of edges corresponds to the physical connections;

receive a first event indication generated by an agent monitoring a first component in the network;

analyze, by the processor, the first event indication based, at least in part, on a first event analysis rule;

determine whether the first event indication indicates a relationship between the first component and a second component;

based on a determination that the first component and the second component are not indicated in the context graph, add a first node for the first component and a second node for the second component to the plurality of nodes in the context graph;

based on a determination that the first event indication indicates a relationship between the first and the second components and based on a first action indicated in the first event analysis rule,
 identify, by the processor, a relationship indication threshold in the first event analysis rule which specifies a minimum number of event indications that indicate a relationship to be satisfied before indicating a component relationship; and
 based on a determination that the first event indication satisfies the relationship indication threshold, add a first edge to the plurality of edges in the context graph to indicate the relationship between the first component and the second component; and utilize the context graph to identify relationships among components for root cause analysis of operational anomalies in the network.

12. The apparatus of claim 11 further comprising program code executable by the processor to cause the apparatus to:
 determine that the first event analysis rule includes information related to a hierarchy of components that includes the first component;
 based on a second action indicated in the first event analysis rule,
 indicate a node for each component in the hierarchy of components in the plurality of nodes; and
 indicate a relationship between each of the nodes corresponding to the hierarchy of components as edges in the plurality of edges.

13. The apparatus of claim 11, wherein the program code executable by the processor to cause the apparatus to create the context graph based, at least in part, on the topology comprises program code executable by the processor to cause the apparatus to:
 receive the topology for at least a third component and a fourth component;
 determine whether the topology information indicates a relationship between the third component and the fourth component; and in response to a determination that the topology information indicates a relationship between the third and the fourth components,
 indicate the third component as a third node in the plurality of nodes;
 indicate the fourth component as a fourth node in the plurality of nodes; and
 indicate the relationship between the third component and the fourth component as a second edge in the plurality of edges.

14. The apparatus of claim 11, wherein the program code executable by the processor to cause the apparatus to determine whether the first event indication indicates a relationship between the first component and the second component comprises program code executable by the processor to cause the apparatus to determine whether the first event indication indicates that the first component invoked the second component.

15. The apparatus of claim 11, wherein the program code executable by the processor to cause the apparatus to add a first node for the first component and a second node for the second component to the plurality of nodes in the context graph comprises program code executable by the processor to cause the apparatus to:
 in accordance with parsing information in the first event analysis rule, parse the first event indication to determine a first identifier for the first component and a second identifier for the second component; and
 indicate the first identifier in the first node and indicate the second identifier in the second node.

16. The apparatus of claim 11, wherein the program code executable by the processor to cause the apparatus to analyze the first event indication based, at least in part, on the first event analysis rule is in response to a determination that the first event indication triggers the first event analysis rule based, at least in part, on a scope of the first event analysis rule.

17. The apparatus of claim 11 further comprising program code executable by the processor to cause the apparatus to:
 indicate attribute data extracted from the first event indication in at least one of the first node, the second node, and the first edge;
 wherein the program code executable by the processor to cause the apparatus to analyze the first event indication based, at least in part, on the first event analysis rule comprises program code executable by the processor to cause the apparatus to extract the attribute data from the first event indication based, at least in part, on attributes identified by the first event analysis rule.

18. The apparatus of claim 11, wherein the first component and the second component are software processes within the network.

* * * * *